United States Patent

Andersen

[15] 3,670,108

[45] June 13, 1972

[54] DECENTRALIZED LOCAL TELEPHONE SYSTEM

[72] Inventor: Bjorn Andersen, Oslo, Norway

[73] Assignees: Max Manus, Landoya Askes; George Manus, Oslo, Norway

[22] Filed: Feb. 25, 1970

[21] Appl. No.: 14,759

Related U.S. Application Data

[63] Continuation of Ser. No. 603,027, Dec. 19, 1966, abandoned.

[30] Foreign Application Priority Data

Jan. 6, 1966 Norway ................................ 161,141

[52] U.S. Cl. ........................................ 179/18 J
[51] Int. Cl. ........................................ H04m 3/00
[58] Field of Search .............................. 179/17.2, 18 J

[56] References Cited

UNITED STATES PATENTS 3,066,192 11/1962 Bartlett ................................ 179/18 J

*Primary Examiner*—Ralph D. Blakeslee
*Attorney*—Young & Thompson

[57] ABSTRACT

An intercommunication system the stations of which contain at least one electro-acoustic transducer, a duplex amplifier and an electronic connections device which in cooperation with an electronic control circuit common to all stations continuously transmits synchronization pulse trains over one pair of conductors to all stations. Over a second pair of conductors, connection is established between the calling station and the called station, if this called station is not busy. All stations are connected in parallel at the same communication time. For each simultaneous communication desired, an extra pair of conductors (communication line) is parallel-connected to all stations together with one connection device in each station and in the common control circuit. This is made possible by the synchronizing pulse train and the coincidence of these pulses and a calling pulse.

4 Claims, 6 Drawing Figures

INVENTOR

BJORN ANDERSEN

By Young & Thompson

ATTYS.

INVENTOR
BJORN ANDERSEN
BY Young + Thompson
ATTORNEYS

INVENTOR
BJORN ANDERSEN
By Young + Thompson
Att'ys

INVENTOR

BJORN ANDERSEN

BY Young + Thompson

ATTYS

INVENTOR
BJORN ANDERSEN
BY Young & Thompson
ATTORNEYS

DECENTRALIZED LOCAL TELEPHONE SYSTEM

This application is a Continuation of application Ser. No. 603,027, filed Dec. 19, 1966, now abandoned.

This invention relates to a decentralized local telephone system in which the receivers contain at least one electro-acoustic transducer, a duplex amplifier and connecting devices to make and break communication over a comparatively small number of common pairs of conductors to which the receivers or stations are connected in parallel so that there will be a pair of conductors available for each desired simultaneous message.

A system of this kind is already known, but this system is little used on account of its complicated construction making it expensive to procure and maintain, yet not very reliable in operation.

The object of this invention is to overcome these disadvantages and this is achieved, according to the invention by the provision of a common control circuit which contains pulse generator, which, at regular intervals, repetitively transmits along a pair of conductors, common to all stations, a pulse train consisting of a number of equal pulses and with a pause before the next pulse train, said pulse train being fed to each station in which the pulses of the train are made to appear sequentially on a number of keys in each station, this number being equal to the number of pulses minus the first pulse, the final pulse of each pulse train being used as calling pulse to enable the stations to seize a free communication line, the stations and the control circuit containing a line unit for each communication line, the control circuit line units each receiving during the pause between pulse trains a respective line pulse from a pulse generator, which line pulse is of a phase characteristic of the line, and when a line pulse appears at the same time as a calling pulse the calling station is connected to the communication line pertaining to this line pulse the calling station at the same time indicating the connection required by the operating keys, one at a time, and at the same time the calling pulse from the calling station, and the line pulse from the communication line, are blocked and a first connecting pulse is supplied to the communication line, which connecting pulse in coincidence with a pulse on the corresponding key in a receiving station, permit access, for a fixed period of time, to the subsequent connecting pulse from the receiving station, and upon the coincidental appearance of said subsequent connecting pulse together with the pulse from the corresponding key in the receiving station, communication between the two stations is established until the connection is broken by one party in that a signal is sent to the control circuit line unit of the established communication line.

A significant advantage of this telephone system, according to the invention, is that it may be expanded as required, in that it is not necessary to change the existing cable installation, it being sufficient merely to connect the new stations to the existing installation.

An example of the invention will be explained below in more detail with reference to the drawings.

Figure 1:
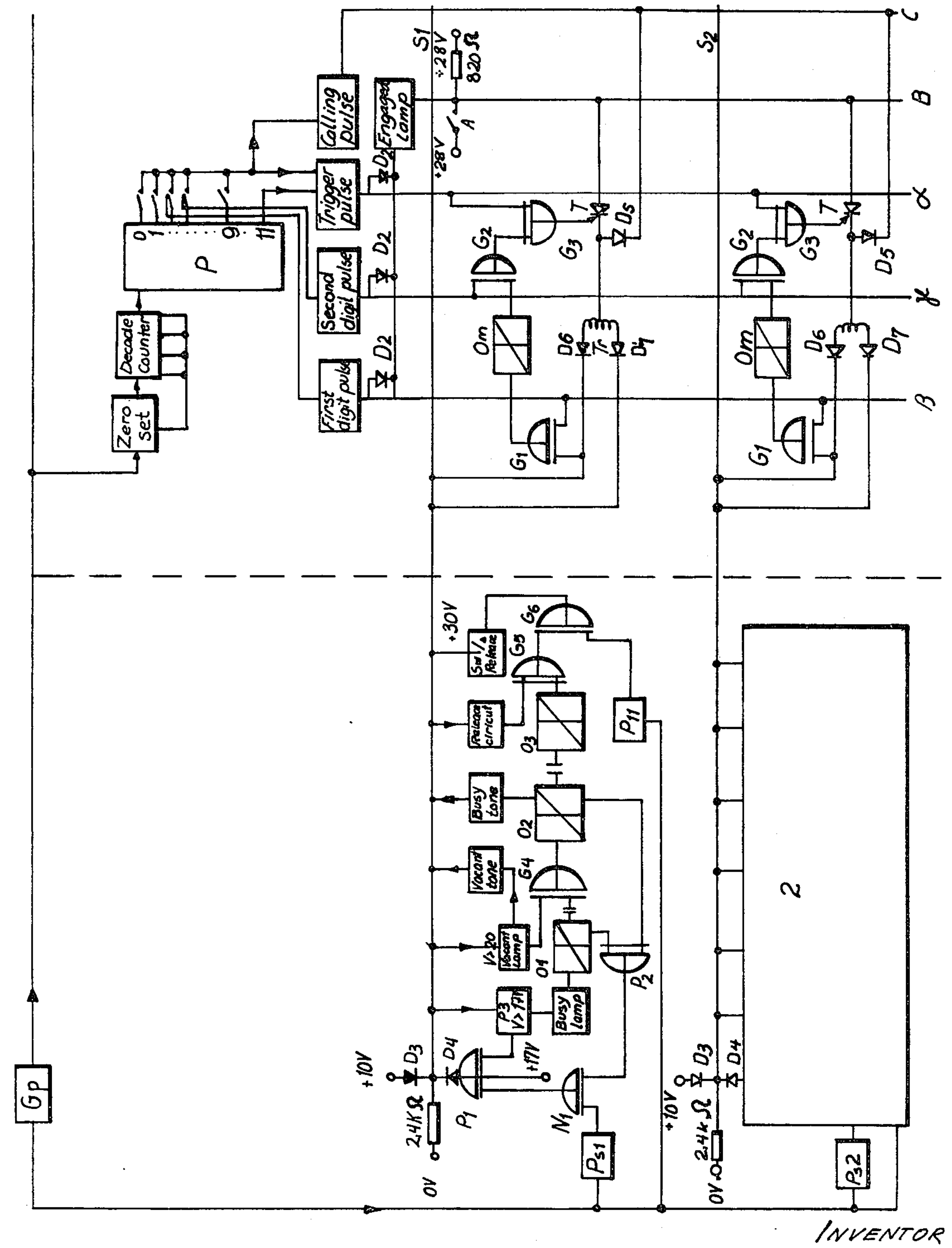
FIG. 1 is a block diagram of a local telephone system according to the invention for two communication lines, the central control unit and one receiver being shown.

The example in FIG. 1 is based on two communication lines and a number of receivers for two digit numbers, that is to say up to 100 receivers, of which only one is shown, and also the common control pack which contains a pulse generator $G_p$ and, in this case, two line units. The number of communication lines is dependent upon the number of line pulses which are supplied by the pulse generator during the pause between the pulse trains which, in this example, consist of 11 pulses.

Should more than 100 receivers be required, these may be arranged in groups of 10 and the first digit used to select the group.

The cable installation may consist of a common pair of conductors for the pulses from the control pack and a common pair of conductors for each communication line, and finally a pair of conductors for power supply. It is clear that these pulses may be transmitted over any combination of conductors and the power pack supplying the current may either be fitted in the individual receivers, or a common power pack may be supplied for groups of receivers in order to reduce the number of leads.

Further, the pulses may also be produced in the individual receivers controlled by a trigger pulse from a common source. Further, the control pack has a line unit for each line. These take care of busy/not busy indication, breaking-off and various other functions common to all the receivers. There is a line unit for each line, and they are fitted to the control pack according to the number of lines. The control pack may be placed anywhere in the system and it is connected to the common cable in the same manner as a receiver.

All the receivers are the same and consist of the following components: a duplex amplifier in connection with loudspeaker and microphone, a pulse unit for control and for the digits, and a line unit for each line. These line units are all the same irrespective of line or receiver. They are fitted to the receivers in conformity with the number of lines required. The receiver's number is pre-set in the pulse unit by the two leads representing digit 1 and digit 2 respectively being connected to the required number from the pulse counting gate circuit. From the fact that each receiver in this way has its own digit selector circuits and line units, it is clear that several receivers may be selected at the same time.

The method of operation of this system will be described below with reference to FIG. 1 which shows the principle in block diagram form. The control pack here is shown to the left in the diagram. It is equipped with two line units, of which only the one is shown in detail. In the right of the diagram a receiver is shown also with two lines.

Figure 2:
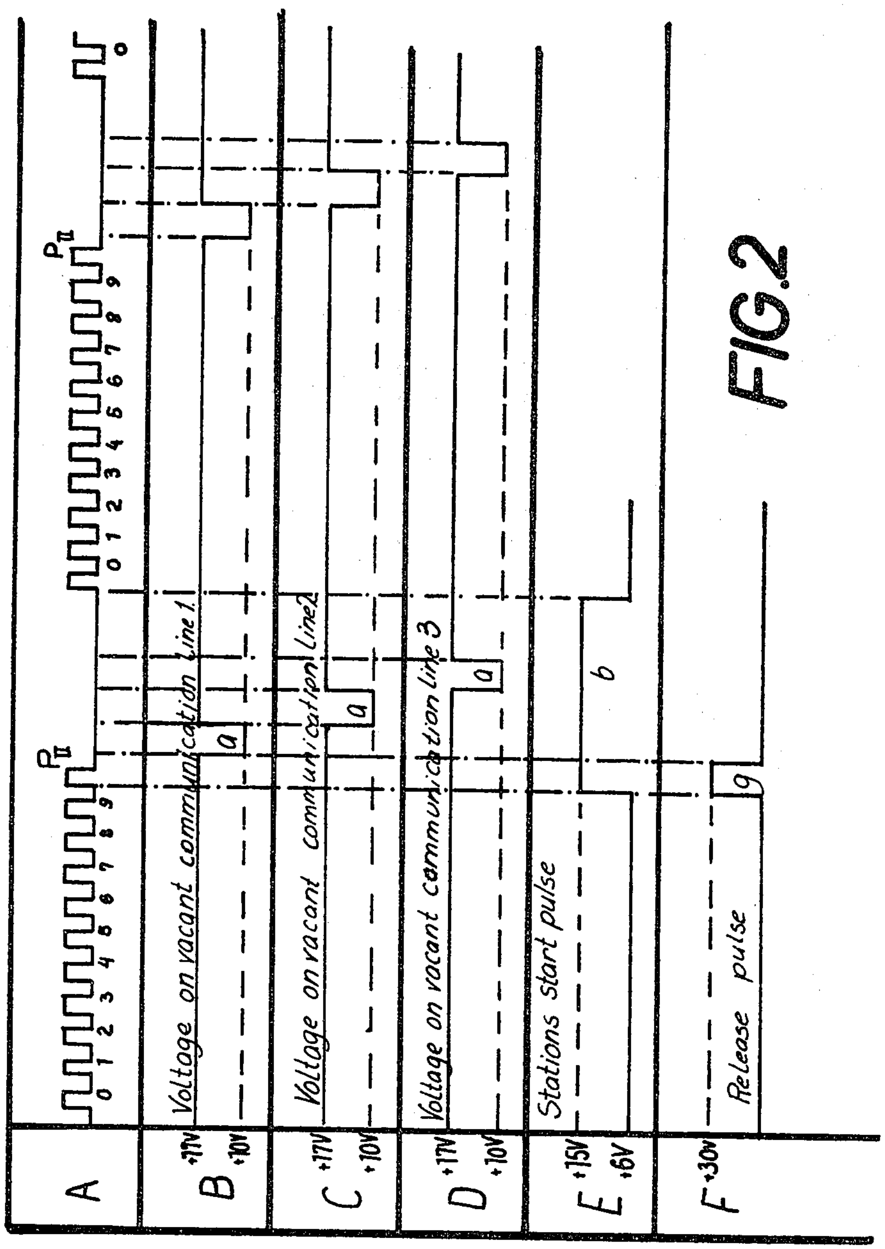
FIG. 2 shows a diagram of the pulse trains, the line pulses between the said pulse trains and the start and break-off pulse.

The pulse generator in the control pack sends out a pulse train as shown at A IN FIG. 2. This consists of groups of eleven pulses with a pause before the next pulse train, with the conductor pair carrying the control pulse connected to a counting circuit in each receiver. These counting circuits are returned to zero during the pauses between the pulse trains. The counting circuit is then connected to the receiver's connectors through a gate circuit. The gate circuit has eleven outputs, each output supplying one pulse to the pulse train. In other words, this means that the same digits in all the receivers correspond to the same pulses in the pulse train. Pulse 1 corresponds to digit 0 and pulse 10 to digit 9. Pulse 11 is used as a scanning pulse to find a vacant line.

The audio signal is connected to the lines through a transformer Tr which has a secondary winding for each line. These secondary windings, together with the diodes D1, form a dynamic gate circuit for the audio signal. These gate circuits are not open until these diodes are biassed in the forward direction. This does not occur until the thyristors T connected to the center tap of the secondary winding are conducting.

In order to simplify the description only the equivalent D.C. circuits of the communication lines are shown.

In the line units of the control pack, the communication lines are connected to zero potential through linear resistors of kilohms. kiloohms. When a communication line is clear for calling, its potential lies at + 17 volts, inasmuch as the positive AND-circuit P1 has + 17 volts on one of its inputs and a positive opening voltage on the other two. In order to achieve selective choice of communication line, all communication lines are in addition fed their respective line pulses during the zero return period in the pause between the pulse trains, see diagram in FIG. 2, curves B, C, D. This is achieved by the line pulse taken from the pulse generator blocking the gate circuit P1 through the gate circuit N1. During the pulse train, the voltage on the communication line will thus not be limited by the 17 volts through the gate circuit P1. A negative going line pulse thus appears on the communication line with a pulse amplitude of + 10 volts, because the lowest positive voltage on the communication line is limited to + 10 volts through diode D3.

As the thyristors T in the receivers' line units have to have a positive voltage on their control electrodes in relation to their cathodes in order to fire, these will for the time being be unaffected by the voltages on the communication lines. The thyristors' control electrodes have, in the state of rest, a potential of + 6 volts, and the control electrodes will thus be negative with relationship to the cathodes also during the course of the pulse train.

Figure 3:
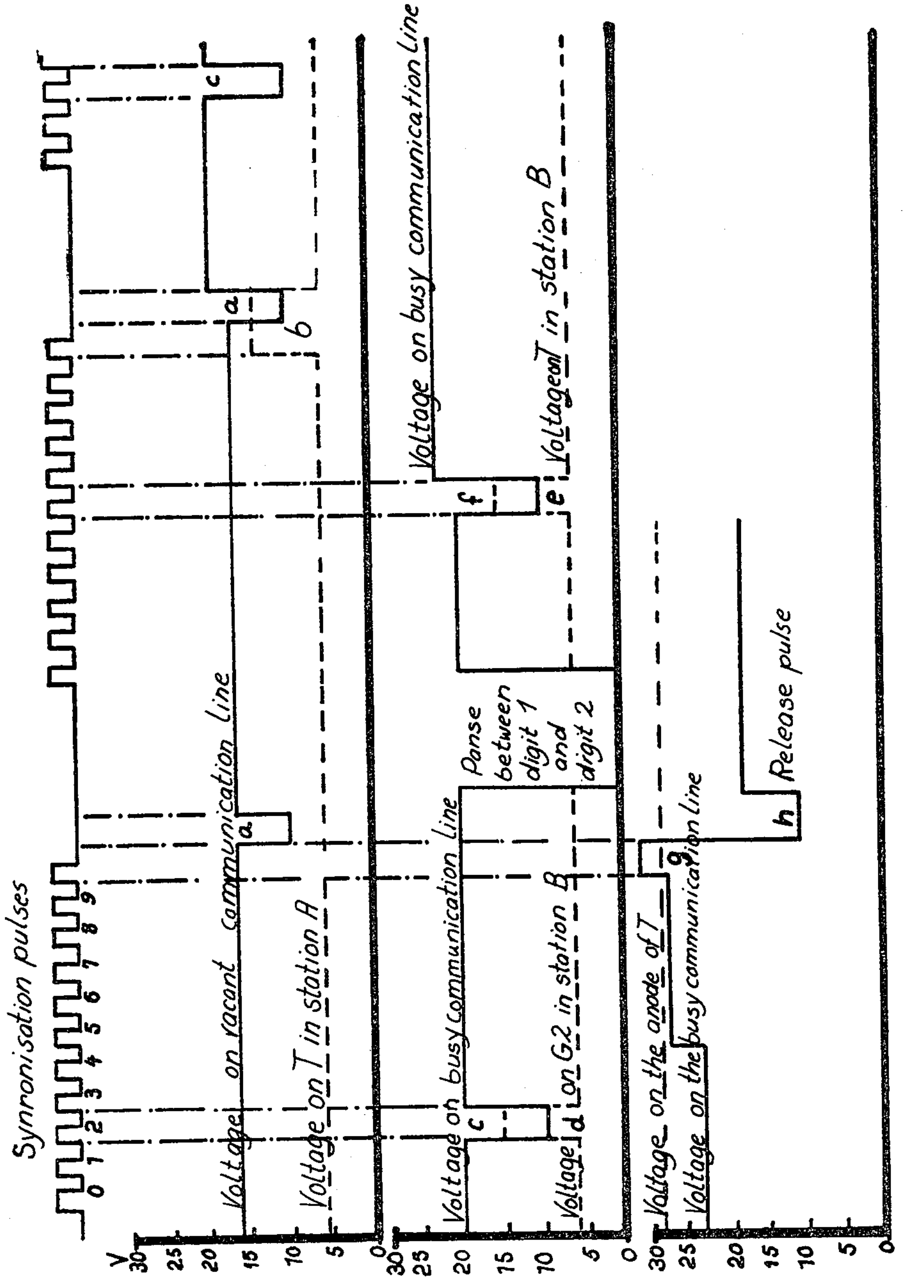
FIG. 3 illustrates the pulses as they appear during digit selection.

When the connectors of a receiver are pressed down, the following occurs: the trigger pulse (start pulse) current path opens and the receiver's thyristor T will, during the pause between pulse trains, receive a voltage pulse of + 15 volts (pulse 11) on its control electrode through the OR-circuitry G3. As the different line pulses are displaced in time with relationship to one another, the thyristor belonging to the line which first becomes active will fire in that the control electrode during the moment of the pulse will be 5 volts positive with relationship to the cathode which then will have a potential of + 10 volts. The anodes of the thyristors are held at + 28 volts through a resistor of 820 ohms. The voltage drop over this resistor caused by the current through the fired thyristor, will now operate the engaged circuit in the receiver which lights a red lamp and at the same time blocks the digit and trigger pulse circuits (start pulse circuits) via the diodes D2 preventing the receiver from being connected to more lines or from receiving calls from other receivers. The current through the thyristor will now also bring about a voltage drop of 20 volts over the 2.4 kilohm resistor in the engaged line unit in the control pack. When the voltage on the communication line now rises to + 20 volts, the diode D4 will block and the line pulse cease with the result that other receivers cannot scan their way into the same communication line, but will enter the next vacant line instead. This voltage increase to + 20 volts will also operate the blocking circuit for P1. The object of this blocking circuit is that, when the voltage on the communication lines falls momentarily to under + 17 volts as occurs when a selector pulse is sent out, the depth of this pulse will not be limited to + 17 volts through P1, but to + 10 volts through D3. The blocking circuit is so designed that it does not immediately open P1 again if the line voltage falls, but is delayed for a period slightly longer than the breadth of the selector pulse. This is shown in FIG. 3. Pulse a is a line pulse, pulse *b* is a trigger pulse for the control electrode of the thyristor.

The next thing that happens is that the selector pulse for digit 1 (pulse *c*, in FIG. 3) is passed to the communication line through diode Ds in the receiver. As the voltage on the communication line is now determined solely by the current through the thyristor, the selector pulse during the period of the pulse, will pull the line potential down to the + 10 volts as limited by the diode D3 in the line unit of the control pack.

In the receiver being called (B subscriber) the following will now occur:

The selector pulse for digit 1 from the communication line will, through the AND-circuit G1 be compared with a pulse from the receiver's own digit 1 circuit. If these are in phase, G1 will be opened and the monostable multivibrator Om in the receiver's line unit will be started. Om will then supply an opening voltage to the AND-circuit G2 in such a way that a pulse from the receiver's digit 2 circuit passes on to the control electrode of the thyristor T via the OR circuit G3. This digit 2 pulse will remain on the control electrode for 2 seconds as Om's time constant is 2 seconds. The receiver initiating the call (A subscriber) must then in the course of these 2 seconds following the first digit selection make a second digit selection in order to impress the digit 2 pulse onto the communication line. This occurs through the diode Ds in the same manner as with the digit 1 pulse. This digit 2 pulse (pulse *f*, in FIG. 3) will now, through the communication line, be passed to the cathode of the thyristor T in the line unit of the receiver being called (B subscriber). At the same time the pulse from the receiver's digit 2 circuit will be passed to the control electrode in the same thyristor. This will thus, for the duration of the pulse, be positive compared to the cathode because both pulses are in phase and the thyristor T fires. In this way, connection is established between the A subscriber and the B subscriber. The increase in the current through the communication line caused by the B subscriber's connection, will thus increase the potential drop over the resistor of 2.4 kilohms in the control pack to + 23 volts. This voltage will operate the vacant indicating circuit in the line unit of the control pack in such a way that the pulse generator for the vacant signal is connected into the communication line. This thus gives a short-duration signal pulse in such a manner that both subscribers (A and B) are advised that connection has been established. The B subscriber's engaged indicator circuit will also operate as a result of the voltage drop which occurs over the 820 ohms resistor in the receiver. The receiver is thus blocked for calls from other subscribers, and a red lamp is illuminated as an optical warning that the receiver is engaged.

Once connection has been established, there is no functional difference between the A subscriber and the B subscriber. The conversation may thus be broken off by either receiver. The conversation is broken off by the anode of the thyristor either in the A or the B subscriber s receiver being brought to a potential of + 28 volts through an interruption switch. The potential on the communication line will then rise to about + 27 volts (on account of the voltage drop over the thyristor and D1) and the control circuit for interruption in the line unit in the control pack is thus operated. The AND-circuit G6 now receives an opening voltage on one of its inputs via the OR-circuit G5. The other input to G6 is connected to the digit 11 pulse which occurs during the pause in the pulse trains. In this manner the AND-circuit G6 will open and a voltage of + 30 volts appears on the communication line during the pulse 11 period (pulse *g*, in FIG. 3). The thyristors T in both receivers (A and B subscribers) will thus be biased in the reverse direction and they fall-out breaking the connection. The voltage on the communication line will then fall to + 17 volts once again and the line pulse will appear with the result that the communication line is again clear for the next call. It will be noted that on breaking off a conversation the interruption occurs during the zero return period (pause in the pulse trains). This is in order to ensure that the act of disconnecting the receivers will not result in other receivers being selected (pulse *h*, in FIG. 3).

If a subscriber tries to call a receiver which is already engaged in another conversation, the following will occur:

As already explained, the voltage on the communication line rises from + 17 volts to + 20 volts when the A subscriber selects his first digit. This voltage increase operates the blocking circuit for the AND-circuit P1 in the control pack line unit. This, in turn, will operate a lamp circuit which gives optical indication that the line is engaged. (This optical indication has no other practical significance than that of checking the line units in the control pack). At the same time as the lamp is lit, the monostable multivibrator $0_1$ is started. This has a time constant of two seconds, that is to say, the same time constant as the monostable multivibrators in the line units of the receivers. When the A receiver selects his second digit, the voltage on the communication line should then rise to + 23 volts through the B subscriber's receiver being connected into the communication line. This however will not occur because the B receiver is already engaged. The voltage on the communication line will thus remain at + 20 volts. As a result of this, the vacant indicating circuit in the line unit in the control pack will not be operated. The AND-circuit G4 will therefore be open when $0_1$ returns to its stable state after 2 seconds following the selection of the first digit. This return of $0_1$ will thus start the monostable multivibrator $0_2$. This connects a audio signal generator into the communication line supplying an engaged signal in such a manner that the engaged signal is operative as long as $0_2$ is in its unstable position, that is to say 3 seconds. When $0_2$ returns to its stable position, $0_3$ will fire. This monostable multivibrator has a time constant which is slightly longer than the duration of a full pulse train. Through the gate circuit G5, the AND-circuit G6 will thus be open when the digit pulse 11 arrives at G6's other input. The interruption circuit will thus disconnect the A subscriber's receiver from the communication line automatically.

If on the other hand the B subscribers' receiver had been free, the voltage on the communication line would have risen to + 23 volts on the second digit being selected. This would in turn operate the vacant indicating circuit in the line unit in the control pack, which in turn would block the AND-circuit G4 in such a way that $0_2$ would not fire when $0_1$ returned to normal. This occurs, of course, only if the selection of the second digit is made before $0_1$ returns, that is to say within two seconds of the first digit being selected. In this manner, the engaged function is blocked when the B receiver is vacant.

The gate circuits N1 and P2 in the line units in the control pack are included in order to prevent wrong numbers being rung by, for example, an A subscriber making a mistake when selecting a digit, and immediately afterwards disconnecting the receiver manually. This digit pulse would operate the first digit circuit in the line to those receivers which have this pulse as their first digit. If now the communication line should immediately become vacant, any other receiver which might be making a call would be able to enter the same communication line and be connected with the receiver whose first digit circuit had already been operated and which had this new selector pulse as second digit. In order to prevent this happening therefore the line unit in the control pack is blocked until all the first digit circuits in the receivers have fallen back into their rest positions. This is achieved by the OR-circuit P2 in the line unit in the control pack blocking the AND-circuit N1 when either $0_2$ or $0_3$ is in its unstable position. The line pulses will thus not be passed on to the communication line until 5 seconds have elapsed from the time the first digit was chosen. It will be noted that also $0_2$ blocks the line pulse ($0_1$ and the first digit circuits of the receivers return to the rest position at the same time), and the reason for this is that the situation might arise in which a receiver which has called another receiver which is engaged, is disconnected manually before the engaged signal ceases disconnecting the receiver automatically. The digit 2 pulse from this receiver will also operate the first digit circuits which are set to this digit. A wrong connection could also result in the same manner if another receiver should call the communication line immediately after this manual disconnection. The above precautions thus guard against such wrong selections.

Figure 4:
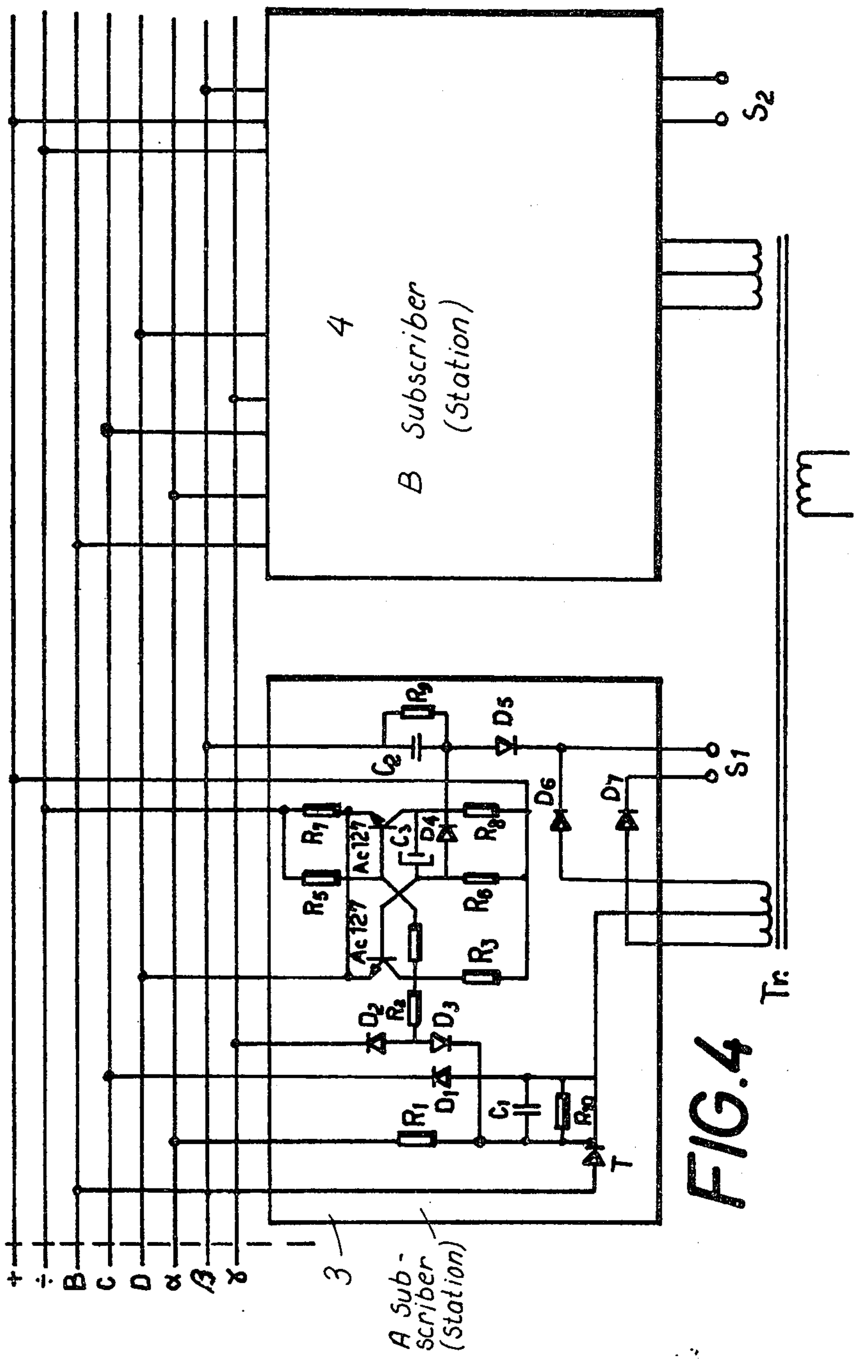
FIG. 4 is a circuit diagram of a receiver line unit.
Figure 5:
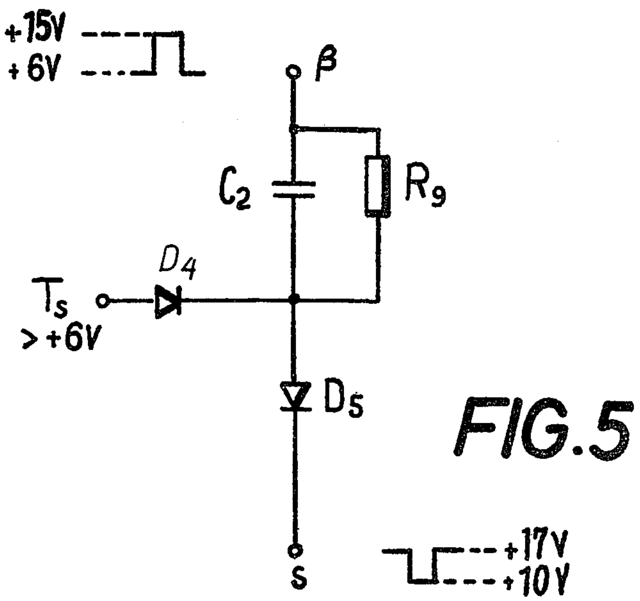
FIG. 5 shows a detail of the circuit in FIG. 4.
Figure 6:
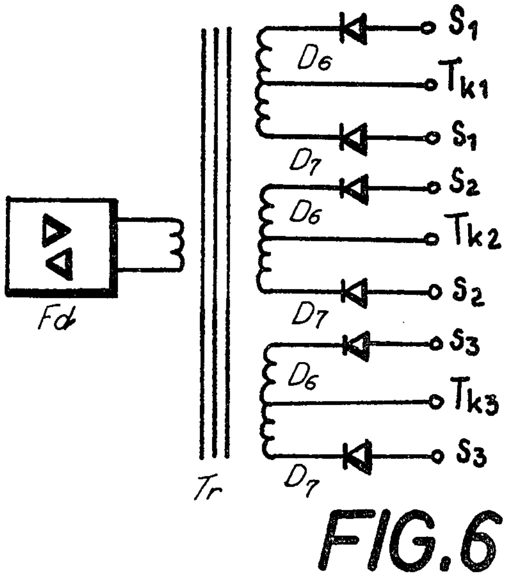
FIG. 6 shows in diagram-form the audio signal connection between a duplex amplifier and three communication lines in a receiver.

FIG. 4 shows two receiver line units connected to a duplex amplifier (not shown) through the transformer Tr. Only the left line unit is shown in detail. The method of connecting three communication lines $S_1$, $S_2$, and $S_3$ is shown in FIG. 6. FIG. 5 shows the AND-gate circuit $G_1$ with the applied pulses.

I claim:

1. In an intercommunication system, the stations of which contain at least one electro-acoustic transducer, a duplex amplifier and connecting devices for the establishment and release of connections using a small number of common pairs of conductors comprising communication lines to which the stations are connected in parallel; the improvement comprising a common control circuit which contains a first pulse generator means which, at regular intervals, repetitively transmits along a pair of conductors common to all stations a pulse train consisting of a number of equal pulses and with a pause before the next pulse train, said pulse train being fed to pulse receiving means at each station operative to provide the pulses of the train sequentially to a number of selector keys in each station, this number of selector keys being equal to one less than the number of pulses in said pulse train, lined seizure circuit means in each station connected to receive and utilize the final pulse of each pulse train in the seizure by a station of a free communication line, line unit means for each communication line connected to a station and to said control circuit, said line unit means including second pulse generator means for providing during the pause between pulse trains a respective line pulse which is of a phase characteristic of a communication line, said line seizure circuit means operating when a line pulse is received at the same time as a calling pulse to connect a station to the communication line represented by this line pulse as a calling station, calling means in each station operative upon connection of said station to a communication line and upon activation of a first selector key to supply a first connecting pulse digit signal from said pulse train through said first selector key to said communication line and upon activation of a second selector key to provide a second digit pulse signal subsequent to said first digit pulse signal to said communication line, and each station connected to said communication line including identification circuit means connected to receive first and second identification pulses from two of said keys, and receiver control means connected to receive said first and second identification pulses and said first connecting pulse digit signal and second digit pulse signal from said communication line, said receiver control means operating when said first connecting pulse digit signal is received in coincidence with said first identification pulse to permit access, for a fixed period of time, to said second digit pulse signal and upon the coincidental reception of said second digit pulse signal and second identification pulse to establish communication over said communication line with said calling station.

2. A system according to claim 1, in which the pulse trains contain eleven pulses which in the stations are passed to a pulse counter which feeds a gate circuit with eleven outputs which sequentially applies the first ten pulses to the connectors which represent the digits 0 to 9 in each receiver, these pulse counters being automatically returned to zero during the pause between the pulse trains.

3. A system according to claim 1, in which the communication line, after the first digit signal has been sent out, is held locked for a predetermined time with the help of a monostable multivibrator to permit the transmission of the next digit signal.

4. A system according to claim 1, in which the receiver line unit comprises a monostable circuit (Om) which through coincidence in a first gate circuit (G), between the first connecting pulse received by the called station from a communication line and a connecting pulse from the station's own connecting device, is brought into an unstable state thus opening an AND-gate circuit (G2) in such a way that a second connecting pulse is passed on to the control electrode in a bistable element (T), which, as long as the monostable circuit remains in the unstable stage, functions through coincidence between the second connecting pulse which is received by the called station from the communication line and the second connecting pulse which is applied to the control electrode in the element (T) which acts as an AND gate circuit.

* * * * *